July 28, 1942.  L. R. KALMBACH  2,291,474
CONVEYING TRUCK
Filed July 13, 1939  2 Sheets-Sheet 1

INVENTOR
L. R. KALMBACH
BY
E. R. Nowlan
ATTORNEY

July 28, 1942.　　　L. R. KALMBACH　　　2,291,474
CONVEYING TRUCK
Filed July 13, 1939　　　2 Sheets-Sheet 2
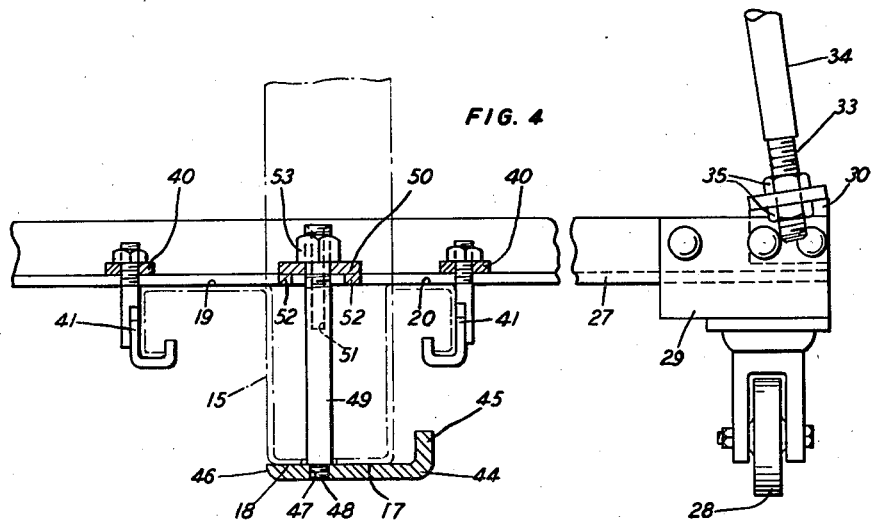
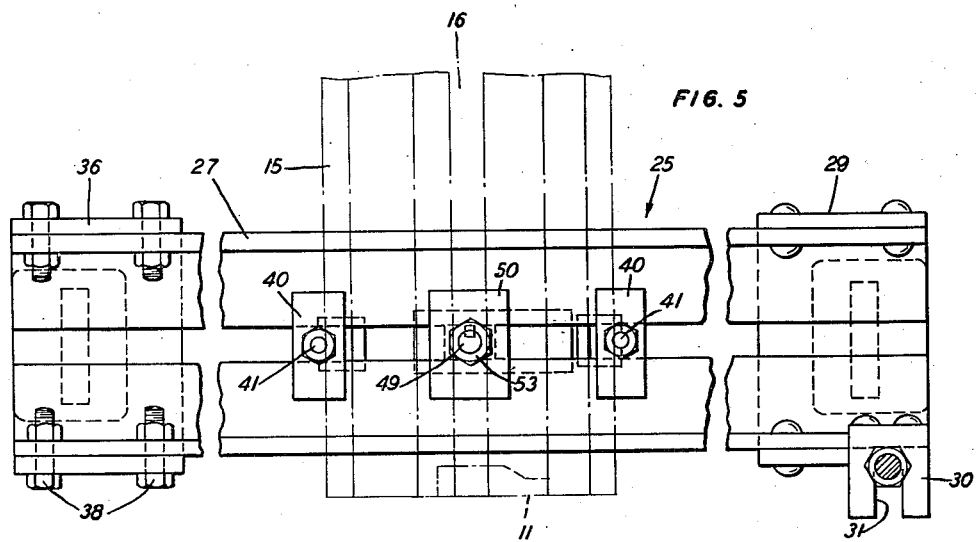
INVENTOR
L. R. KALMBACH
BY
E. R. Nowlan
ATTORNEY Patented July 28, 1942

2,291,474

UNITED STATES PATENT OFFICE 2,291,474

CONVEYING TRUCK

Lloyd R. Kalmbach, West Englewood, N. J., assignor to Western Electric Company, Incorporated, New York, N. Y., a corporation of New York Application July 13, 1939, Serial No. 284,166

7 Claims. (Cl. 280—61)

This invention relates to conveying trucks, and more particularly to trucks for conveying vertical frames.

Frames for telephone equipment, for example, the crossbar type, extend vertically to almost ceiling height and are frequently mounted in closely positioned rows necessitating conveying means capable of supporting the frames for movement in their vertical positions through narrow aisles and into positions relative to each other without lifting the frames more than a predetermined short distance from the floor.

An object of the invention is to provide simple, efficient and practical conveying trucks, particularly for vertical frames or the like.

With this and other objects in view, the invention comprises conveying trucks having caster units equipped with removable attachments to support a frame raised but a short distance and brace the frame in a vertical position it will assume when mounted with other frames.

Other objects and advantages will be apparent from the following detailed description when taken in conjunction with the accompanying drawings, wherein Fig. 1 is a side elevational view of the conveying truck shown supporting a vertical frame;

Fig. 4 is a fragmentary elevational view of one of the caster units, portions thereof being shown in section, and Fig. 5 is a fragmentary top plan view of one of the caster units.

Figure 1:
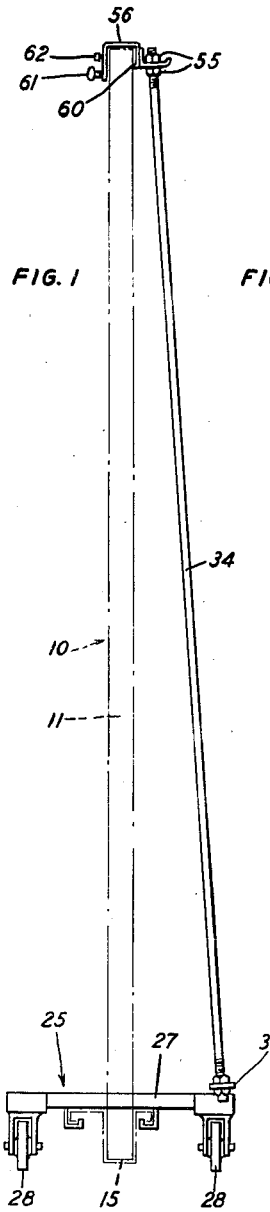

In the present embodiment of the invention the conveying trucks consist mainly of caster units, with means for securing articles to be supported by the units designed to support a vertical frame 10 used in switchboard equipment. In order that all the available space possible may be utilized for telephone equipment the frames 10 are constructed to almost ceiling height and it is desirable to place the frames in closely positioned rows, allowing sufficient space for the maintenance of the various electrical units which are disposed in the frames, yet leaving aisles which are too narrow for the use of hoisting apparatus and other equipment in moving the frames into their respective positions. The frame 10 shown has vertical side members 11, a central member 12, a top member 13, a plurality of lateral members 14, and a base member 15. The base member is formed of two parts having the cross sectional contours shown in Figs. 4 and 5 and spaced from each other, as indicated at 16 in Fig. 5. These parts of the base provide flat lower surfaces 17 and 18 lying in a common plane and flat upper surfaces 19 and 20 lying in a common plane parallel to the under surfaces. The portions of the base also have downwardly and inwardly extending portions, as illustrated in Fig. 4.

To form a conveying truck capable of supporting and conveying the frame 10 through narrow aisles and into position with respect to other frames certain problems presented themselves. One problem was to determine how a heavy frame of such height could be supported without raising the frame but a slight distance from the floor. Another problem was to determine the supporting of the frame with means capable of moving the frame through narrow aisles, and another the pressing of the frame to hold the frame in its true vertical position which it is to assume when disposed in place.

In view of these and other problems, caster units, indicated generally at 25, were formed. These caster units are identical in structure with the exception of the positioning of the brace support and a description of one will apply equally well to both units.

Referring now to Figs. 4 and 5, it will be observed that the caster unit shown consists mainly of a horizontal body 27 formed of two spaced angle members supported at each end by a caster 28. Each caster is of the pivot type, supported by U-shaped members 29 which receive the ends of the body members. The caster at the right is fixed to the body members by rivets or the like extending through the vertical portions of the U-shaped members 29 and the vertical portions of the angle members of the body 27. Certain of the rivets or securing means also extend through a brace support 30 to secure it in place, as shown in Figs. 4 and 5. The brace support 30 is notched, at 31, to removably receive the lower threaded end 33 of a brace 34, nuts 35 being disposed upon the lower threaded end to assist in bracing the frame in a truly vertical position and supported by the caster unit. The caster 28 at the left is supported in the same manner by a U-shaped member 36 which is removably secured to the angle members of the body 27 by bolts 38 or the like, thus making possible the removal of one caster from the body in order to readily assemble the unit on the frame for supporting the latter.

Apertured plates or members 40 extend across the space between the angle members of the body 27 and are secured to the horizontal portions of these angle members by suitable means, such as welding. Central apertures are provided in the members 40 for removing the receiving supporting elements 41 in the form of J bolts which assist in supporting the frame, their main purpose being, however, to definitely locate and hold the frame in a desired position with respect to the caster unit. The main supporting element consists of a supporting element or plate 44 having one end bent vertically, at 45, and the other end rounded at 46. Intermediate the ends of the element 44 is a tapped opening 47 for receiving a reduced threaded end 48 of a supporting stud 49. The reduced threaded end 48 is of a sufficient length controlled by the shoulder formed by the reduced portion, to extend into but not through the supporting element. The supporting stud 49 extends upwardly between the members of the base 15 and through the opening between the angle members of the body 27. A keyed member 50 is centrally apertured to receive the stud 49, a key portion thereof extending into a keyway 51 of the supporting stud. The member 15 is of sufficient length to rest upon the horizontal portions of the angle members of the body 27 and has downwardly extending projections 52 positioned in the opening between the angle members to eliminate rotary movement of the member 50. A nut 53 readily disposed upon the upper end of the supporting stud provides means for moving the element 44 in close engagement with the lower surfaces of the base. The brace 34 is allowed to extend upwardly at an angle due to the angular position of the support 30, so that the upper end of the brace may be removably connected to the upper end of the frame 10. The upper end of the brace 34 is substantially identical in structure to the lower end illustrated in Fig. 4, it being provided with a reduced threaded portion upon which are disposed nuts 55 to removably secure the brace to a brace bracket 56 and to allow for adjustment to locate the frame in a truly vertical position on the caster unit. The bracket 56 has a forked member 57 for connection with the upper end of the brace 34 fixed to a U-shaped portion 58. The leg of the U-shaped portion 58 supporting the forked member 59 has an inwardly projecting plug 60 positioned to extend under the top member 13 of the frame, as shown in Fig. 4. The other leg of the U-shaped member 58 has threaded apertures, one to receive a thumb screw 61 and the other to receive the conventional type of set screw 62, the hand screw being used to locate the bracket in assembly and the set screw 62 being used to rigidly secure the bracket against displacement.

In mounting the caster units on the frame the frame is raised a slight distance from the support or floor by suitable means, such as a hoist. The removable casters are taken from the body portion of each caster unit so that each body thereof may be moved through the frame and allowed to rest upon the upper surfaces of the base 15. The removable casters are then secured to each body of their respective units. The caster units are then located and secured in positions within the side walls or members 11 of the frame by placing the J bolts 41 in place and thus securing the bodies of the caster units to the base of the frame. The supporting elements are next secured in place by positioning them with their threaded apertures so as to receive the threaded ends 48 of the supporting studs. The supporting studs are then rotated to form a tight connection with the supporting elements which are prevented from rotating by the projections 45. The members 50 are then disposed in place over the upper ends of the supporting studs, with the keys thereof extending into the keyways 51 of the supporting studs and the projections 52 positioned in the opening between the angle members of the bodies 27. The nuts 53 are then moved in place to rigidly secure the supporting elements to the base 15.

Figure 2:
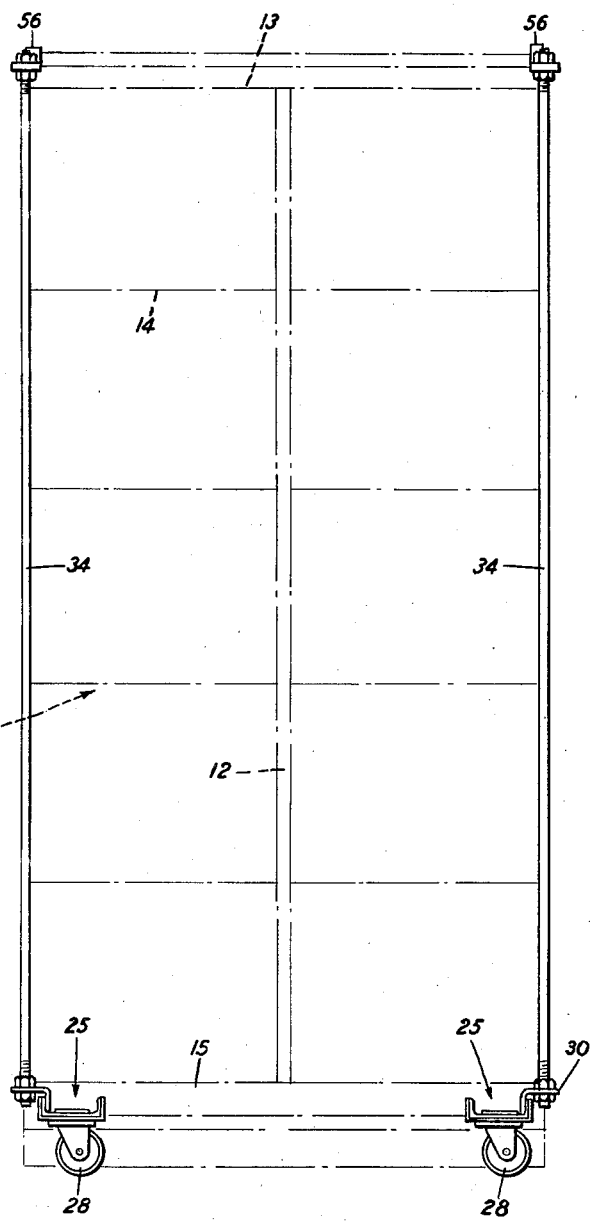
Fig. 2 is a front elevational view illustrating two conveying trucks supporting the vertical frame.
Figure 3:
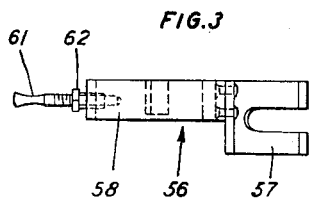
Fig. 3 is a top plan view of one of the brace supports.

Braces 34 are next disposed in place. Fig. 2 illustrates the only difference between the caster units, this difference being in the positioning of the brace supports 30, they being disposed so that they will support their respective braces adjacent the sides of the frame. The brackets 56 are then disposed upon the top portion 13 of the frame so that the plugs 60 will extend their length, as illustrated in Fig. 1, the brackets being temporarily located and held in place by the thumb screws 61. The braces 34 are then disposed in place, with the nuts 35 and 55 loose thereon, so as to make suitable adjustments to thoroughly brace the frame in a desired vertical position. When this has been accomplished the nuts are tightened and the set screws 62 is forced in place. The frame may then be released by the hoist or whatever means is used in lifting it for the assembly of the caster units and the frame is ready to be moved to the position in which it is to be mounted.

It will be observed that the caster units are positioned within the sides of the frame and the frame is supported in a position slightly removed from the support or the floor, making possible the movement of the frame through the narrow aisles and into a position with respect to other frames. It is frequently desirable to assemble certain frames in certain positions and ofttimes frames are mounted not in succession in rows but leaving spaces for other frames. With the frames shown in the present embodiment, there is only a small clearance, for example, one-sixteenth ($\frac{1}{16}$) of an inch over the width of the frame between two other frames between which the frame is to be disposed. It is possible with the supporting of the frame on the caster units to move the frame into its respective position and hold the frame until it is secured to the adjacent frame and has had mounting plates disposed therebeneath upon which the base 15 rests and is mounted. Therefore, it is not only possible to convey the frame with the aid of the caster units through narrow aisles and into position but it is possible to support the frame while being secured or mounted in place. The caster units may then be removed by removing the brackets 56, the braces 34, then removing the removable casters 28, removing the J bolts 41 and the supporting elements 44 together with the supporting studs and the members 50, and drawing the bodies free of the frame.

The embodiment of the invention herein disclosed is illustrative and may be widely modified and departed from in many ways without departing from the spirit and scope of the invention as pointed out in and limited only by the appended claims.

What is claimed is:

1. A conveying truck for vertical frames having base portions, the conveying truck comprising a body movable through a frame to be conveyed and above a base thereof, casters secured at spaced positions to the body, one being removable for the movement of the body through the frame, and means to removably secure the body to the base to support the frame.

2. A conveying truck for vertical frames having base portions, the conveying truck comprising a body movable through a frame to be conveyed and above a base thereof, casters secured at spaced positions to the body, one being removable for the movement of the body through the frame, a supporting element positionable beneath the base of the frame, and means to removably secure the element to the body.

3. A conveying truck for vertical frames having base portions, the conveying truck comprising a body movable through a frame to be conveyed and above a base thereof, casters secured at spaced positions to the body, one being removable for the movement of the body through the frame, and means capable of securing the base of the frame in a conveying position adjacent the body and lowering the base to a rest position.

4. A conveying truck for vertical frames having base portions, the conveying truck comprising a body movable through a frame to be conveyed and above a base thereof, casters secured at spaced positions to the body, one being removable for the movement of the body through the frame, means to removably secure the body to the base to support the frame, and a brace extending transversely between the body and the upper portion of the frame and secured thereto.

5. A conveying truck for vertical frames having base portions, the conveying truck comprising a body movable through a frame to be conveyed and above a base thereof, casters secured at spaced positions to the body, one being removable for the movement of the body through the frame, a supporting element positionable beneath the base of the frame, and means carried by the body and conditioned to extend through the base to removably secure the element to the body.

6. A conveying truck for vertical frames having base portions, the conveying truck comprising a body movable through a frame to be conveyed and above a base thereof, casters secured at spaced positions to the body, one being removable for the movement of the body through the frame, and spaced hook members carried by the body for securing the base to the body and conditioned to lower the frame to a rest position on the base.

7. A conveying truck for vertical frames having base portions, the conveying truck comprising a body movable through a frame to be conveyed and above a base thereof, casters secured at spaced positions to the body, one being removable for the movement of the body through the frame, means capable of securing the base of the frame in a conveying position adjacent the body and lowering the base to a rest position, and an adjustable means to brace the frame in a desired vertical position for the conveying of the frame to and the securing of the frame to another like frame.

LLOYD R. KALMBACH.